United States Patent [19]

Hayashi

[11] Patent Number: 5,479,485
[45] Date of Patent: Dec. 26, 1995

[54] FACSIMILE APPARATUS COMPRISING CORDLESS TELEPHONE SET

[75] Inventor: Motohiko Hayashi, Yamatokoriyama, Japan

[73] Assignee: Sharp Kabushiki Kaisha, Osaka, Japan

[21] Appl. No.: 684,851

[22] Filed: Apr. 15, 1991

[30] Foreign Application Priority Data

Apr. 18, 1990 [JP] Japan .................................. 2-104189

[51] Int. Cl.⁶ ................................................ H04M 11/00
[52] U.S. Cl. ............................. 379/61; 379/100; 358/400
[58] Field of Search ............................. 379/61, 100, 352; 358/400, 442, 468

[56] References Cited

U.S. PATENT DOCUMENTS

| | | |
|---|---|---|
| 4,456,793 | 6/1984 | Baker et al. . |
| 4,564,724 | 1/1986 | Nakayama et al. . |
| 4,868,865 | 9/1989 | Ogawa et al. ............................ 379/100 |
| 4,881,259 | 11/1989 | Scordato . |
| 4,908,851 | 3/1990 | Kotani et al. ............................ 379/100 |
| 4,942,600 | 7/1990 | Suzuki ..................................... 379/100 |
| 4,953,201 | 8/1990 | Hashimoto ............................... 379/352 |

FOREIGN PATENT DOCUMENTS

| | | |
|---|---|---|
| 310001 | 4/1989 | European Pat. Off. . |
| 0123133 | 9/1981 | Japan . |
| 0242738 | 12/1985 | Japan . |
| 62-35758 | 2/1987 | Japan . |
| 0095060 | 5/1987 | Japan . |
| 62-199156 | 9/1987 | Japan . |
| 63-107353 | 5/1988 | Japan . |
| 63-263966 | 10/1988 | Japan . |

OTHER PUBLICATIONS

The Sharper Image Catalog Advertisement, "Oniden Combination Phone", Jan. 1986, p. 34.

Primary Examiner—Dwayne D. Bost

[57] ABSTRACT

A facsimile apparatus incorporating a cordless telephone function includes a base unit for receiving and transmitting a signal to and from a remote unit via a radio signal, and a facsimile communication device. A reception signal detecting device within a NCU first makes the determination whether the reception signal transmitted through the telephone line includes a CNG signal representing facsimile communication. When determination is made that the reception signal includes a CNG signal, the telephone line is connected to the facsimile apparatus. When determination is made that a CNG signal is not included, the telephone line is connected to the base unit. According to the type of reception signal from the telephone line, the telephone line is connected to the facsimile apparatus or the cordless telephone set.

4 Claims, 6 Drawing Sheets

FACSIMILE APPARATUS COMPRISING CORDLESS TELEPHONE SET

BACKGROUND OF THE INVENTION

1. Field of the Invention

The present invention relates to facsimile apparatus, and more particularly, to a facsimile apparatus incorporating a cordless telephone set capable of ensuring automatic switching between the telephone set and the facsimile communication portion.

2. Description of the Background Art

In accordance with the recent spread of facsimile apparatus and cordless telephone sets, a facsimile apparatus incorporating a cordless telephone set has been developed. In such a facsimile apparatus, a reception signal detecting circuit for detecting a reception signal from a telephone line is provided in the main body of the facsimile apparatus and in the base unit of the cordless telephone set.

A reception signal of 16 Hz detected by the reception signal detecting circuit of the base unit is converted into a rectangular wave and applied to a CPU controlling the entire base unit. CPU transmits a control signal to a remote unit by radio via a RF transmitting portion of the base unit. When a control signal is detected in the remote unit, the CPU of the remote unit emits the ringing burst to notify that there is a reception from an external line to the operator. The ringing burst is also emitted according to the detected reception signal in the main body of the facsimile apparatus to inform the operator of a reception from the external line.

In the above described facsimile apparatus, the main body of the facsimile apparatus is provided with telephone/facsimile apparatus automatic switching function. This switching function connects the telephone line to the main body of the facsimile apparatus on detecting a reception signal and makes determination whether a CNG signal facsimile request signal is transmitted or not. If a CNG signal is transmitted, the facsimile carries out the reception operation. If a CNG signal is not received, i.e. if a voice communication request signal is transmitted, the ringing burst is emitted to call the operator.

When there is a reception signal from an external line, the ringing burst is emitted simultaneously from both the main body of the facsimile apparatus and the cordless telephone set in a conventional facsimile apparatus. If the telephone receives a reception signal in the cordless telephone set, the above mentioned telephone/facsimile automatic switching function does not work.

SUMMARY OF THE INVENTION

An object of the present invention is to ensure automatic switching of telephone/facsimile in a facsimile apparatus that includes a telephone function.

Another object of the present invention is to prevent the inhibition of receiving facsimile signal when receiving a communication signal from an external line in a facsimile apparatus incorporating a cordless telephone set with a remote unit.

The above objects are achieved by a facsimile apparatus including the following elements. A facsimile apparatus according to the present invention includes a first communicating device for transmitting and receiving an aural signal via a telephone line, a second communicating device for transmitting and receiving an image signal via the telephone line, a reception signal detecting circuit provided between the telephone line and first and second communicating devices for detecting a reception signal from the telephone line, a determining device for making determination whether or not the reception signal detected by the reception signal detecting circuit requests communication with the second communicating device, and a line connecting device for connecting the telephone line to the first communicating device when the determining device determines that the reception signal is the aural signal and the second communicating device when the determining device determines that the reception signal is the image signal.

Determination is made of the presence of a request for communication with the second communicating device first, whereby the telephone line is connected in response to this communication request. Because the determination of the communication request of the second communicating device is made first, appropriate automatic switching between the first communicating device and the second communicating device is possible.

Preferably, the first communicating device includes a cordless telephone set having a remote unit, whereby the line switching device connects the remote unit to the telephone line only when communication with the second communicating device is not requested.

The disadvantage of the remote unit being first connected to the telephone line to prevent switching of the second communicating device to the telephone line is eliminated because communication with the remote unit is allowed only when determination is first made that there is no communication request for the second communicating device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
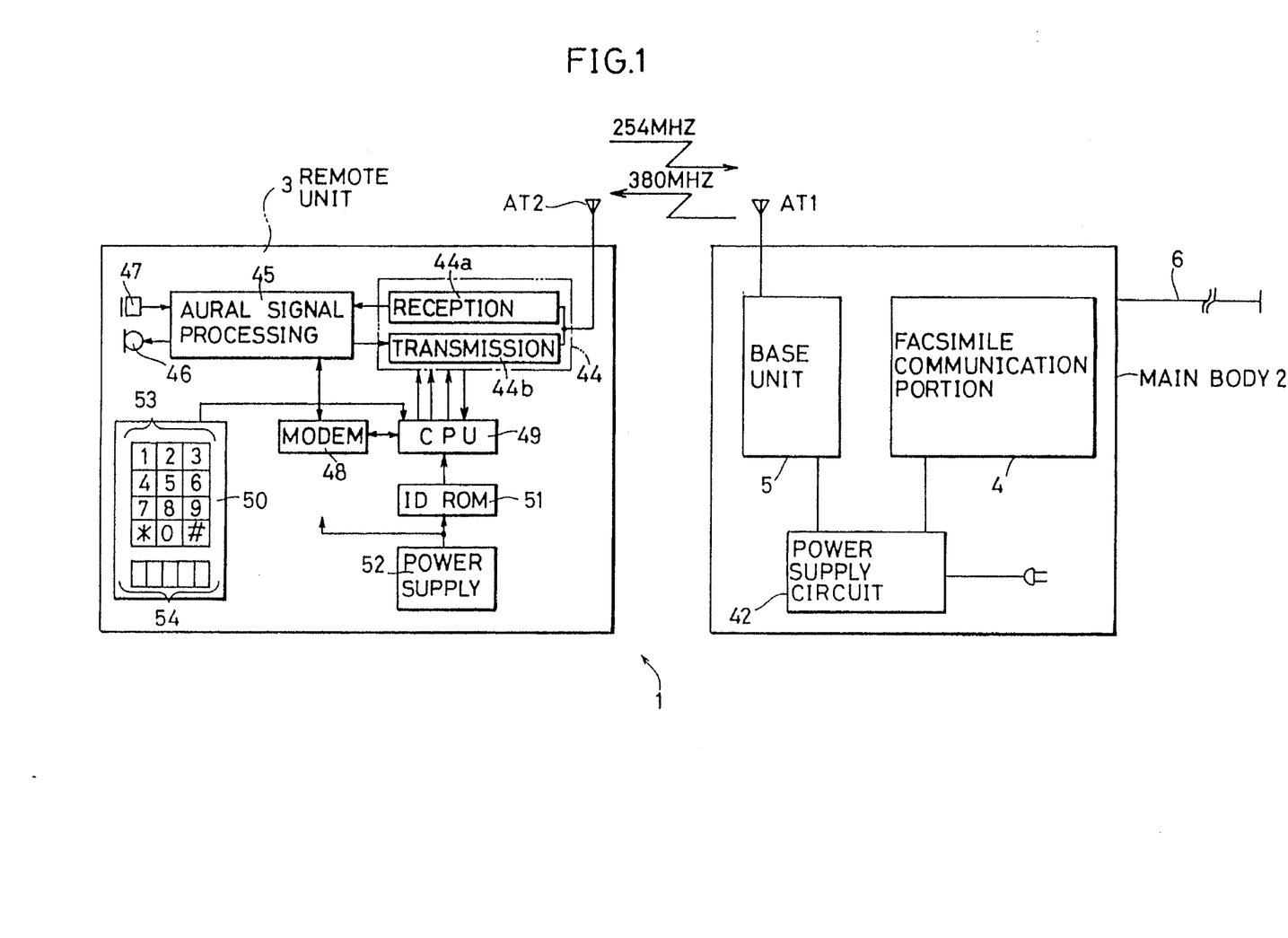
FIG. 1 is a block diagram schematically showing a facsimile apparatus comprising a cordless telephone set according to the present invention.

Referring to FIG. 1, a facsimile apparatus 1 having a cordless telephone set according to the present invention comprises a main body 2 connected to a telephone line 6, and a remote unit 3 connected to main body 2 by radio communication. Main body 2 comprises a facsimile communication portion 4, a base unit 5 connected to remote unit 3 by radio communication, and a power supply circuit 42 for providing power supply to facsimile communication portion 4 and base unit 5.

Figure 2:
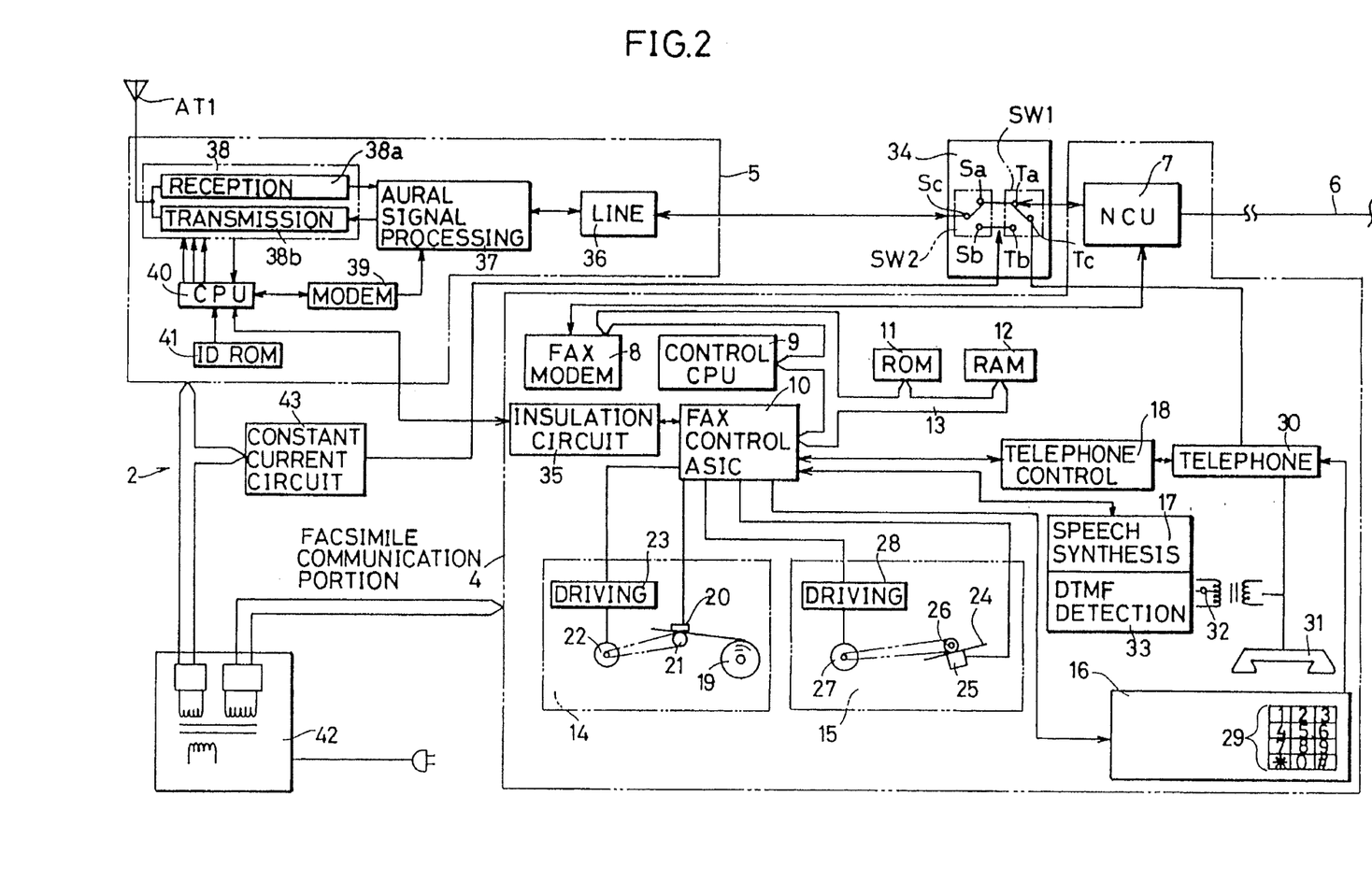
FIG. 2 is a block diagram showing in detail a base unit and a main body constituted by a facsimile communication portion of the facsimile apparatus comprising telephone function according to the present invention.

The structure and the operation of main body 2 according to the present invention will be explained hereinafter with reference to FIG. 2. Referring to FIG. 2, telephone line 6 is connected to an NCU (Network Control Unit) of facsimile communication portion 4. NCU 7 comprises a CML (Connect Modem to Line) relay for a terminating signal detecting circuit (not shown) to connect a FAX modem 8 to telephone line 6. NCU 7 supplies the signal received via telephone line 6 to FAX modem 8. FAX modem 8, a control CPU 9, a FAX control ASIC 10 controlling the entire facsimile apparatus, a ROM 11 and a RAM 12 are interconnected by a data bus 13. Control CPU 9 identifies the signal from FAX modem 8 to control FAX control ASIC 10. FAX control ASIC 10 controls a recording device 14, a reading device 15, an operation panel 16, a speech synthesis circuit 17, and a telephone control portion 18 according to the output of control CPU 9. Programs required for various control are stored in ROM 11. Data used at the time of various processing operation are stored in RAM 12. A work area is also set in RAM.

Recording device 14 records the received image data on a record sheet 19. A record head 20 is pressed against a roller 21 with record sheet 19 therebetween. Record sheet 19 is recorded according to a recording signal from FAX control ASIC 10. Roller 21 is rotated by a motor 22, whereby record sheet 19 is forwarded in synchronism with the recording speed of record head 20. A driving circuit 23 controls motor 22 according to a control signal from FAX control ASIC 10.

Reading device 15 optically reads the original image of an original 24. Original 24 is pressed against a reading sensor 25 such as a CCD (Charge Coupled Device) by a roller 26. Roller 26 is rotated by driving a motor 27, whereby original 24 is forwarded to be read by reading sensor 25. A driving circuit 28 controls motor 27 according to a control signal from FAX control ASIC 10.

Operation panel 16 comprises a ten-key 29. A PB (Push Button) signal generated by operating ten-key 29 is supplied to a telephone portion 30. Telephone portion 30 carries out the calling operation according to the PB signal from operation panel 16. Telephone portion 30 is provided with a handset 31 for talking. A speech synthesis circuit 17 and a DTMF detector 33 are connected between telephone portion 30 and handset 31 via a transformer 32. DTMF (Dual Tone Multi Frequency) is a signal of a combination of particular frequencies indicating the numeric values of a telephone number, the priority rank, or the end of a signal.

Various aural messages synthesized by speech synthesis circuit 17 are provided to an external line or a remote unit 3 from the speaker of handset 31 and through telephone portion 30. DTMF detector 33 detects a DP (dual pulse) signal or a PB signal received by telephone portion 30 to provide that signal to FAX control ASIC 10. Telephone portion 30 is controlled by a telephone control portion 18.

FAX control ASIC 10 carries out transmission/reception of a signal to or from base unit 5 via an insulation circuit 35 such as a photocoupler.

An internal/external line switcher 34 carries out the switching of an internal line and an external line among base unit 5, telephone line 6 and telephone portion 30. Internal/external line switcher 34 comprises switches SW1 and SW2.

Terminal Ta of switch SW1 is connected to terminal Sa of switch SW2. Terminal Tb of switch SW1 is connected to terminal Sb of switch SW2. Switch SW1 has terminal Ta connected to NCU 7, and terminal Tc connected to telephone portion 30. Base unit 5 is connected to terminal Sc of switch SW2. Base unit 5 and telephone portion 30 are capable of communication with the external line by connecting terminal Ta to terminal Tc in switch SW1, and terminal Sa to terminal Sc in switch SW2. Telephone portion 30 is capable of communication with the external line by connecting terminal Tb to Tc in switch SW1. Internal line communication is capable between base unit 5 and telephone portion 30 by connecting terminal Tb to terminal Tc in switch SW1 and terminal Sb to terminal Sc in switch SW2.

The structure of base unit 5 will be explained hereinafter. A line circuit 36 is connected to terminal Sc of internal/external line switcher 34. Line circuit 36 is provided with a speech network for controlling the transmission and reception of an aural signal through the handset, and a dialer to generate a DT signal or a PB signal for calling the telephone set of the called side. An aural signal processing circuit 37 is connected to line circuit 36. Aural signal processing circuit 37 comprises a limiter for controlling the amplitude value of the voltage and a compounder (a compressor circuit and an expander circuit) for compressing/expanding an aural signal. The processing of aural signals received via line circuit 36 and transmission/reception circuit 38 are carried out in aural signal processing circuit 37. The received control signal is supplied to a CPU 40 via a modem 39.

CPU 40 controls base unit 5 and remote unit 3 according to a control signal provided via a modem 39, a control signal provided from transmission/reception circuit 38, and a control signal provided from FAX control ASIC 10 via insulation circuit 35.

An IDROM 41 is stored with ID (identification) codes for each cordless telephone set specified by the Minister of Posts and Telecommunications. At the time of connection of radio line, an ID code is transmitted to remote unit 3, whereby the ID code is verified so that signals are not sent to other remote units.

Transmission/reception circuit 38 comprises a receiving circuit 38a and a transmitting circuit 38b. Receiving circuit 38a demodulates a reception signal received by antenna AT1 to provide that signal to aural signal processing circuit 37 and CPU 40. Transmitting circuit 38b modulates/demodulates a signal provided from aural signal processing circuit 37 and CPU 40 to transmit a signal to a remote unit from antenna AT1 at a frequency of, for example, 380 MHz (refer to FIG. 1).

Main body 2 and base unit 5 of facsimile apparatus 1 are provided with power from power supply circuit 42. Power from power supply circuit 42 is also supplied to a constant current circuit 43. Constant current circuit 43 supplies the direct constant current to internal/external line switcher 34 to provide direct current to the communication path for internal line talking.

The structure of remote unit 3 will be explained hereinafter with reference to FIG. 1. The reception signal received by an antenna AT2 is supplied to a receiving circuit 44a of transmission/reception circuit 44 and is demodulated. The aural signal is supplied to aural signal processing circuit 45. The control signal is supplied to a CPU 49. A transmitting circuit 44b modulates the aural signal and the control signal from aural signal processing circuit 45 and CPU 49 to send the signal from antenna AT2 to base unit 5 at, for example, 254 MHz. CPU 49 controls remote unit 3 according to the control signal from receiving circuit 44a, the control signal supplied via modem 48, and key pulses from operation panel 50.

ID codes for each cordless telephone set specified by the Minister of Posts and Telecommunications are stored in an IDROM 51. At the time of connection of radio line, an ID code is transmitted to base unit 5 to verify the ID code.

Aural signal processing circuit 45 processes an aural signal from transmission/reception circuit 44 and a control signal from CPU 49 via modem 48 to provide these signals from a telephone transmitter 46. Aural signal processing circuit 45 processes the aural signal from a telephone receiver 47 to provide that signal to transmitting circuit 44b of transmission/reception circuit 44. Operation panel 50 comprises a ten-key 53 and a mode specifying key 54. Each key has a separate frequency signal which is supplied to CPU 49. Remote unit 3 is power supplied by a power supply 52.

The detail structure and operation of the cordless telephone is described in U.S. Pat. No. 4,881,259. Therefore, the same is hereby incorporated by reference into the present application.

Figure 3:
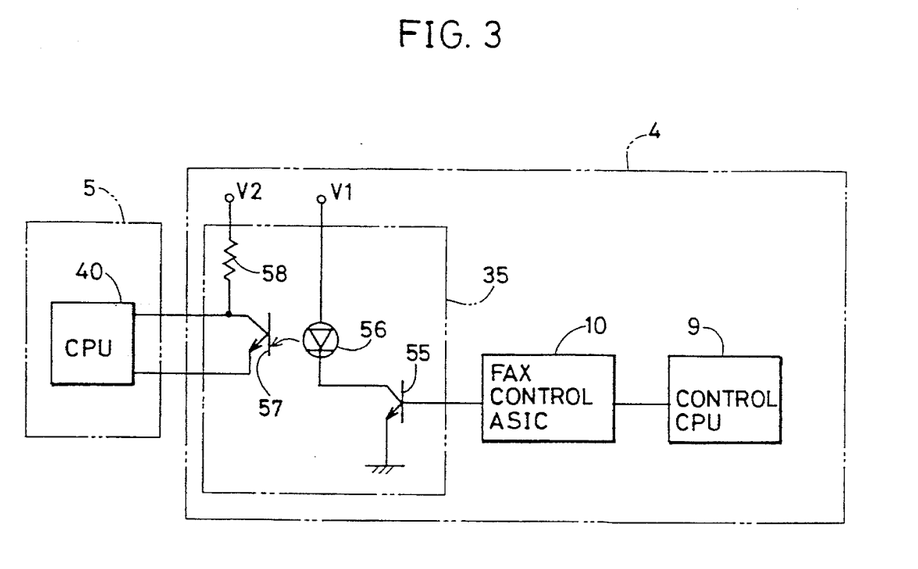
FIG. 3 is a circuit diagram showing an example of an insulation circuit.

The structure of an insulation circuit 35 will be explained with reference to FIG. 3. Insulation circuit 35 carries out reception and transmission of a signal between control CPU 9 of facsimile communication portion 4 and CPU 40 of base unit 5 without electrical connection therebetween. Insulation circuit 35 comprises a photocoupler 56, for example.

Insulation circuit 35 comprises a NPN type transistor 55, a photocoupler 56, a NPN type phototransistor 57, and a resistor 58. Transistor 55 is turned on when the signal from control CPU 9 is supplied to the base of transistor 55 via FAX control ASIC 10. Voltage V1 from a power supply is applied to photocoupler 56, whereby photocoupler 56 emits light. Phototransistor 57 is turned on when light from photocoupler 56 is directed into the base of phototransistor 57. Voltage V2 from a power supply is applied to phototransistor 57 via resistor 58, whereby the voltage is detected by CPU 40. Accordingly, voltage is detected by CPU 40 only during the period when the signal provided from control CPU 9 attains a high level. This allows transmission of a signal without electrical connection. A circuit similar to insulation circuit 35 is used in transmitting a signal to control CPU 9 from CPU 40.

Figure 4:
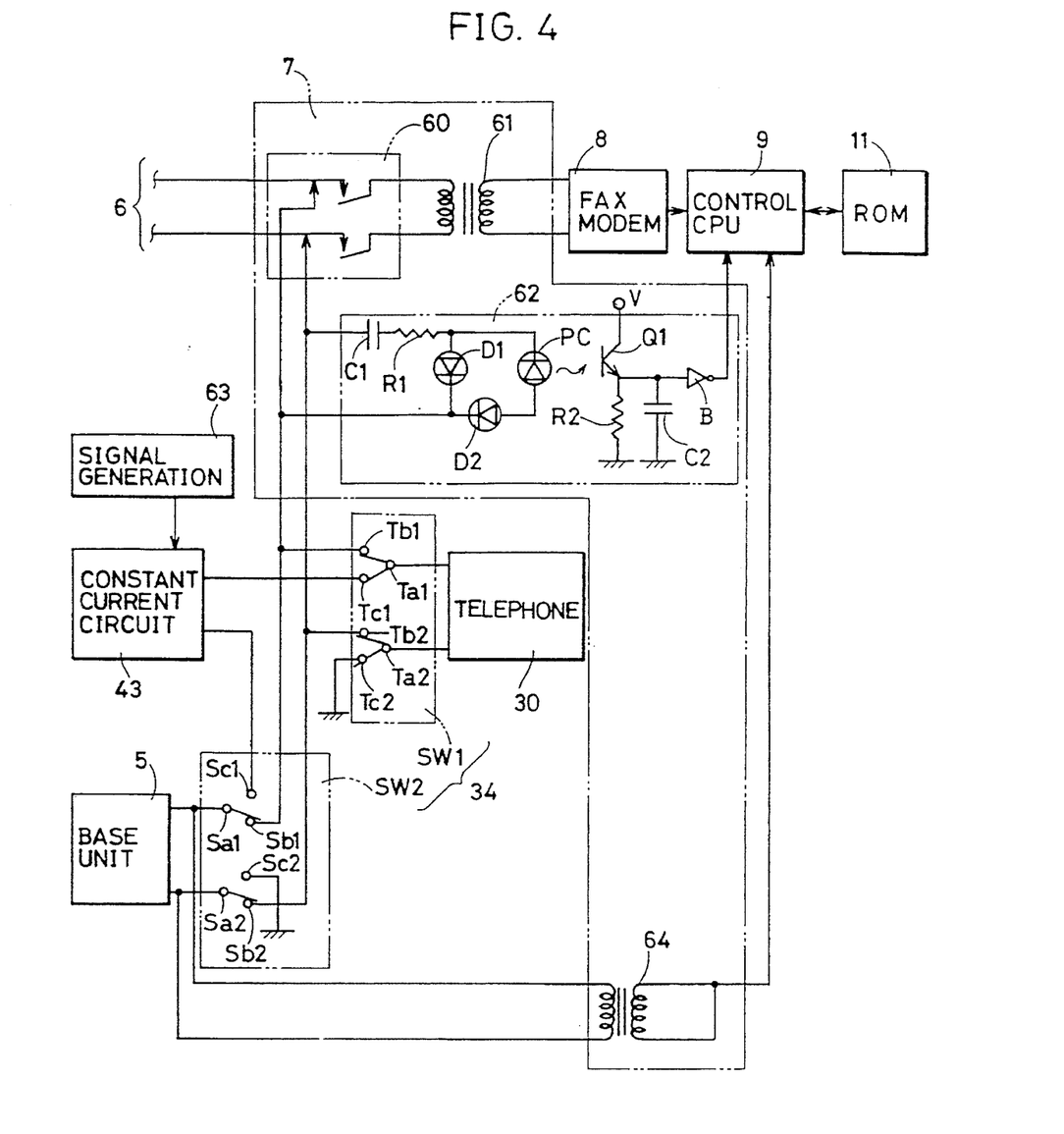
FIG. 4 is a circuit diagram showing the internal of a NCU and its periphery.

Referring to FIG. 4, a NCU 7 comprises a CML relay 60, transformers 61 and 64, and a reception signal detecting circuit 62. Telephone line 6 is connected to a FAX modem 8 via CML relay 60 and transformer 61, and to reception signal detecting circuit 62.

Reception signal detecting circuit 62 comprises a condenser C1, a resistor R1, diodes D1 and D2, and a photocoupler PC. When a reception signal from an exchanger not shown enters reception signal detecting circuit 62, photocoupler PC emits light which is directed to the base of a NPN type phototransistor Q1. Phototransistor Q1 has the connector applied with voltage V, and the emitter grounded via a resistor R2. An inverting circuit B is connected to the emitter via condenser C2. The output of inverting circuit B is applied to CPU 9.

Therefore, the output of inverting circuit B is normally at a high level. The incident of light from photocoupler PC to the base of phototransistor Q1 turns on phototransistor Q1, whereby the output of inverting circuit B attains a low level. This results in the acknowledgement of receiving a reception signal by CPU 9.

In response to the reception signal, CPU 9 transmits a response signal to the caller, whereby a CNG signal is transmitted from the caller in case of facsimile communication. The detection of a CNG signal by CPU 9 causes the connection of telephone line 6 with FAX modem 8 by CML relay 60 to receive signals in the facsimile apparatus. When a normal voice communication is requested, CPU 9 emits the ringing tone of telephone portion 30 or remote unit 3.

Telephone line 6 is connected to telephone portion 30 of facsimile communication portion 4 via switch SW1, and to base unit 5 via switch SW2. When talking through an external line, switch SW1 has terminals Ta1 and Ta2 connected to terminals Tb1 and Tb2, respectively, and switch SW2 has terminals Sa1 and Sa2 connected to terminals Sb1 and Sb2, respectively. This allows talking through an external line with telephone portion 30 or remote unit 3.

In the case of internal line voice communication, i.e. talking between remote unit 3 and telephone portion 30 of facsimile communication portion 4, switch SW1 has terminals Ta1 and Ta2 connected to terminals Tc1 and Tc2, respectively, and switch SW2 has terminals Sa1 and Sa2 connected to terminals Sc1 and Sc2, respectively. As a result, base unit 5 and telephone portion 30 are connected via constant current circuit 43. The voice communication path is supplied with DC constant current from constant current circuit 43, whereby talking is carried out between telephone portion 30 and remote unit 3.

Figure 5:
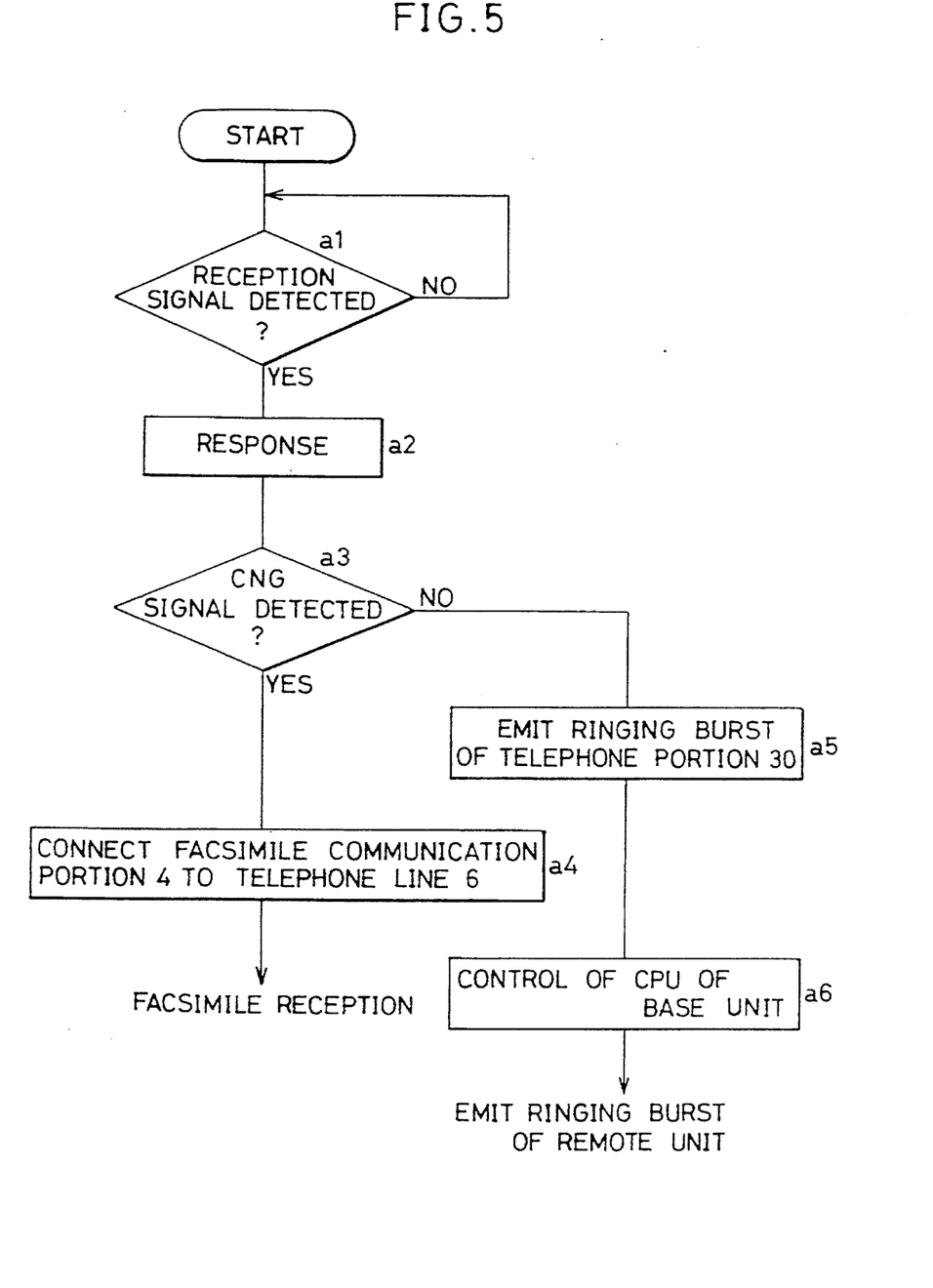
FIG. 5 is a flow chart for explaining the operation of the facsimile apparatus.

The operation of facsimile apparatus 1 will be explained hereinafter with reference to FIGS. 4 and 5. At step a1, control CPU 9 makes determination whether a reception signal is detected or not according to a signal from reception signal detecting circuit 62 in NCU 7. If a reception signal is detected, a response signal is transmitted to the caller party at step a2.

At step a3, control CPU 9 makes determination whether a CNG signal is transmitted or not, i.e. whether the caller is requesting a facsimile communication or not according to the output from reception signal detecting circuit 62. In the case of facsimile communication, CML relay is switched to connect telephone line 6 to facsimile communication portion 4 to carry out reception of facsimile at step a4.

If a facsimile communication is not requested, i.e. if voice communication is requested, telephone portion 30 of facsimile communication portion 4 is controlled to emit a ringing burst at step a5. At step a6, control CPU 9 controls CPU 40 of base unit 5 via FAX control ASIC 10 and insulation circuit 35. As a result, a ringing burst is emitted from remote unit 3. That is to say, CPU 40 of base unit 5 controls CPU 49 of remote unit 3 to provide a ringing burst.

According to the present invention, the reception signal from an exchanger is first detected at facsimile communication portion 4. The type of communication from the caller is identified in control CPU 9 of facsimile communication portion 4. When determination is made that the communication is not a facsimile communication, the ringing bursts of telephone set 30 of facsimile communication portion 4 and remote unit 3 are emitted. As a result, the reception signal of facsimile communication will not be received by remote unit 3. This eliminates the operation of transferring the external line signal received by remote unit 3 to facsimile communication portion 4.

Figure 6:
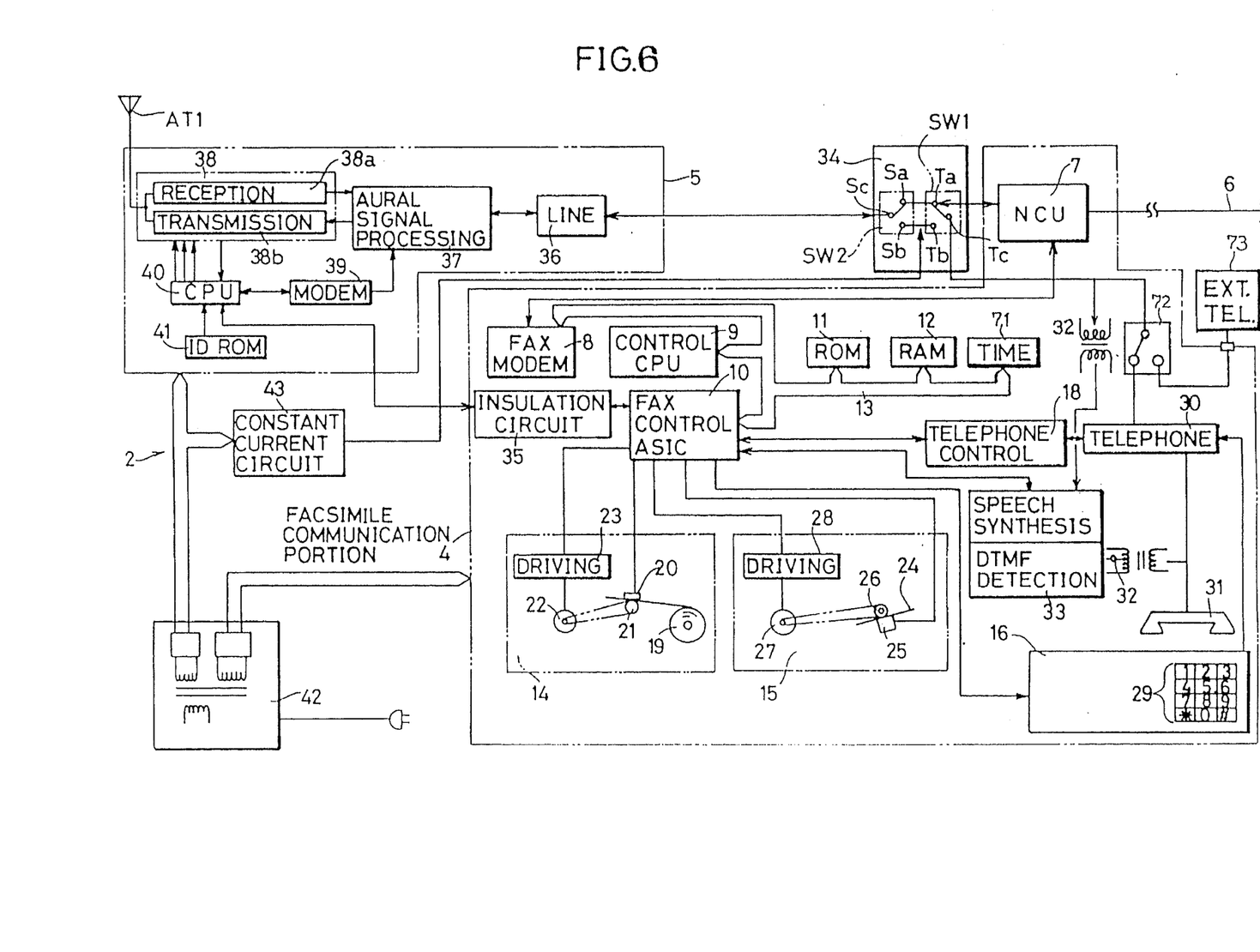
FIG. 6 is a block diagram showing in detail a facsimile apparatus with an extension telephone set.

With reference to FIG. 6, if a facsimile apparatus comprising an extension terminal 72 for connecting a telephone set, the calling of a cordless telephone set and an extension telephone set 73 can be carried out selectively. For example, it is possible to call the extension telephone set 73 during the daytime, and to switch to call the cordless telephone set at night. As a result, a facsimile apparatus comprising a telephone set of more convenience can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus comprising:

first communication means comprising a cordless telephone set having a remote unit, for transmitting and receiving an aural signal via a telephone line;

portable handset means for transmitting and receiving an aural signal via airwaves to and from said first communication means, respectively;

second communication means for transmitting and receiving an image signal via said telephone line;

reception signal detecting means, said reception signal detecting means comprises a photocoupler connected to said telephone line for responding to a communication signal from an exchanger, provided between said telephone line and said first and second communication means for detecting a reception signal from said telephone line;

determining means for making determination in sequence, first whether said reception signal requests communication with said second communication means, when said reception signal detecting means detects said reception signal and second, whether said reception signal requests communication with said first communication means, so that appropriate automatic switching can be performed between the first communicating means and said second communicating means;

ringing means, responsive to said determining means, for transmitting via airwaves a ringing burst only upon the determination that said reception signal requests communication with said first communication means;

line connecting means, responsive to the determination result of said determining means, for connecting said first communication means when said determining means determines that said reception signal is said aural signal and said second communication means with said telephone line when said determining means determines that said reception signal is said image signal, said line connecting means allows communication with said first communication means only when said determining means makes determination that communication with said second communication means is not requested, a fax portion control containing a control central processing unit and a photocoupler; and a base unit with a central processing unit, operatively connected to said control central processing unit in said fax portion, so that when a signal from the control central processing unit is forwarded from said control unit a power supply activates said photocoupler for actuating a phototransistor so that voltage is detected by said central processing unit in said base unit.

2. The facsimile apparatus of claim 1, wherein said control central processing unit first activates a transistor through a fax control.

3. The facsimile apparatus of claim 2, wherein said photocoupler is operatively connected to a phototransistor.

4. The facsimile apparatus of claim 3, wherein the phototransistor is operatively by connected to a resistor through which a voltage flows to said phototransistor, so that said central processing unit in said base unit only detects when the signal from the control central processing unit is at a high level.

* * * * *